United States Patent [19]

Payne

[11] 4,451,186
[45] May 29, 1984

[54] TOOL FOR USE IN LINE BORING OF DIESEL ENGINE BLOCKS

[76] Inventor: Charles L. Payne, 5404 NE. 56th Pl., Kansas City, Mo. 64119

[21] Appl. No.: 251,171

[22] Filed: Apr. 6, 1981

[51] Int. Cl.³ ............................................. B23B 41/12
[52] U.S. Cl. ................................... 408/54; 33/180 B; 408/115 R; 408/708
[58] Field of Search ................ 408/708, 54, 72 R, 75, 408/103, 115, 21, 234; 82/1.2, 2 E; 33/180 B, 181 AT

[56] References Cited

U.S. PATENT DOCUMENTS

| | | | |
|---|---|---|---|
| 1,434,004 | 10/1922 | Greven | 408/103 |
| 1,953,402 | 4/1934 | Graham | 408/21 |
| 2,248,998 | 7/1941 | Johnson et al. | 408/54 |
| 2,439,492 | 4/1948 | Sharratt et al. | 408/54 |
| 2,651,221 | 9/1953 | Foster | 408/708 |

Primary Examiner—Z. R. Bilinsky
Attorney, Agent, or Firm—Kokjer, Kircher, Bradley, Wharton, Bowman & Johnson

[57] ABSTRACT

A tool for use in the line boring of diesel engine cylinder blocks. The tool includes a mounting pad having a pair of holes for fitting over dowel pins projecting from the end of the cylinder block. A central opening of the pad is then centered in alignment with the bores of the engine block to receive a bearing providing rotative support for a shaft. The shaft extends through the center of each bore to permit accurate cutting of damaged bore areas with a cutting tool on the shaft. The bearing can be adjusted in limited fashion by an adjustment mechanism on the pad to assure that the shaft is centered in any undamaged bores that are present. An adapter plate permits mounting of the pad on engine blocks having locating openings instead of dowel pins.

5 Claims, 7 Drawing Figures

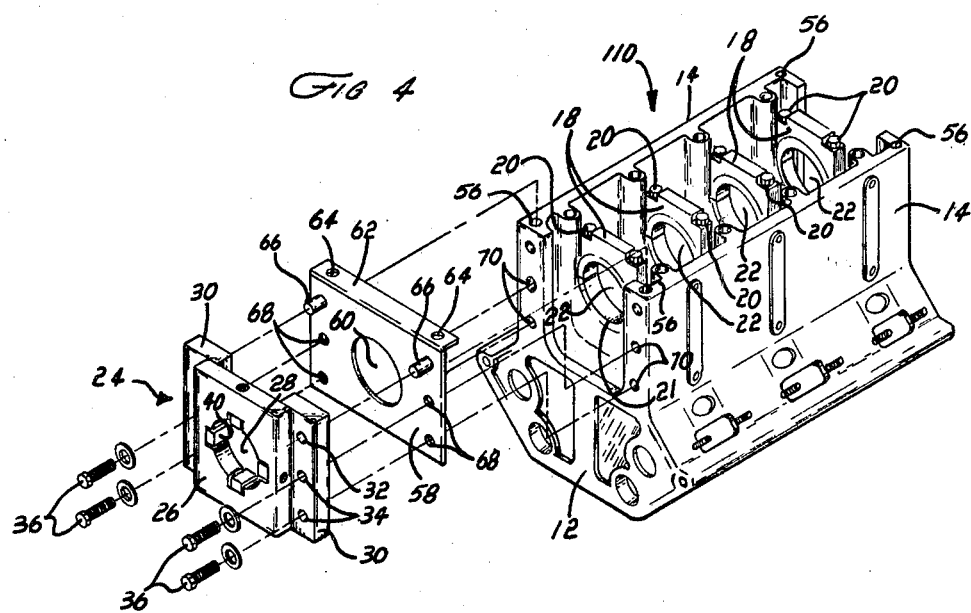
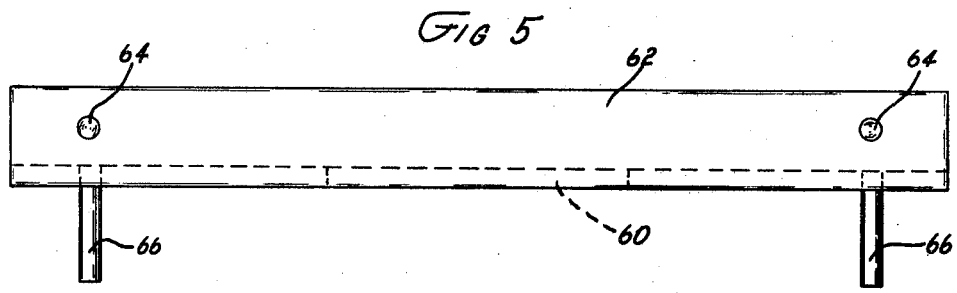
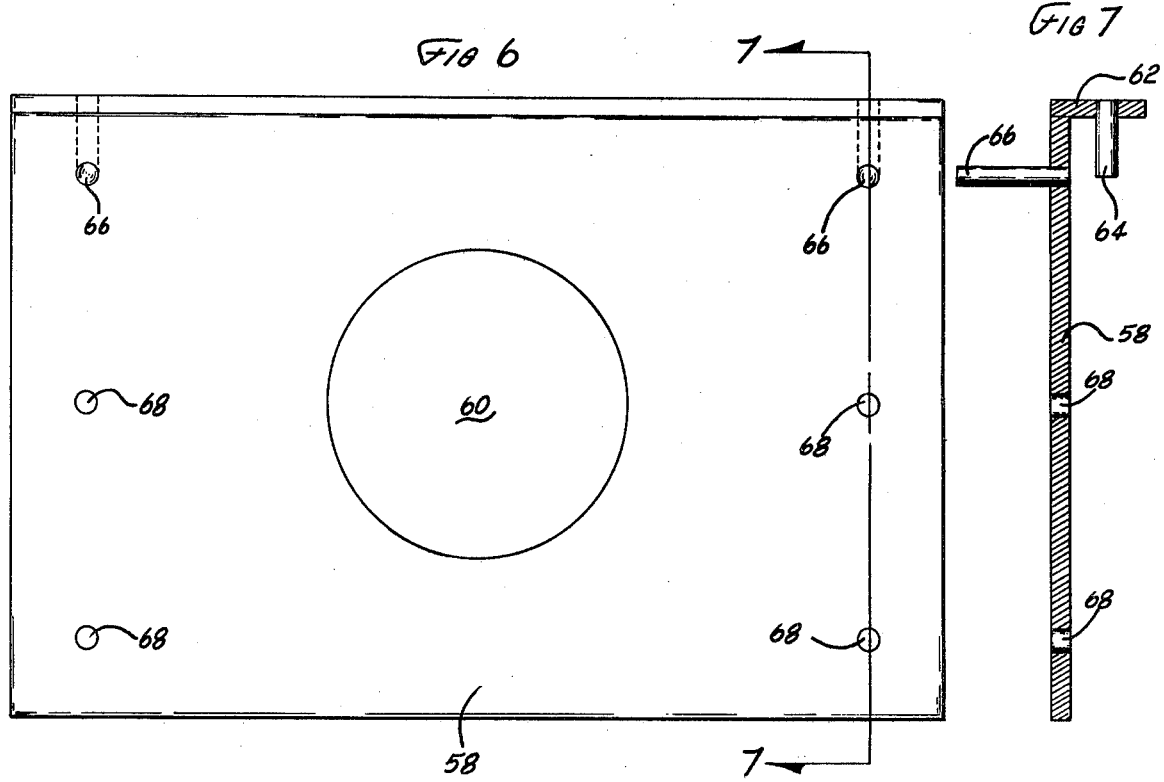

TOOL FOR USE IN LINE BORING OF DIESEL ENGINE BLOCKS

BACKGROUND OF THE INVENTION

This invention relates in general to the line boring of diesel engine blocks and deals more particularly with a tool which facilitates and enhances the accuracy of the line boring operation.

The main bearings which support the crankshaft of a diesel engine become overheated at times and, as a result, become damaged to an extent requiring replacement of the bearings. Additionally, the extreme temperatures can sometimes cause severe heat deformation of the bores in the cylinder block which receive the bearings. Each bore is formed in part by a curved "saddle" portion of the cylinder block and in part by a "cap" which is bolted to the block and which has a curved surface forming the bottom half of the bore.

If the bores for the crankshaft bearings are damaged severely, replacement bearings cannot be properly fitted in them. Consequently, it is necessary to cut away the damaged areas of the saddle and cap by a process known as line boring. In the line boring operation, a shaft is extended through the centers of the aligned bores and is rotated to drive a cutting tool in a circular path. The cutting tool thus enlarges the bore by cutting away the damaged areas. A sleeve bushing can then be inserted in each enlarged bore to permit the bearing to be properly received in the bushing.

It is essential that the damaged bores be cut such that their centers are in exact alignment with one another and with the center line of the cylinder block. Otherwise, the crankshaft will not be supported properly and the engine will not be able to operate in an acceptable manner. At present, little difficulty is encountered in line boring cylinder blocks having at least two undamaged bores. Bearings in the undamaged bores provide support for the shaft and form a guide for centering the shaft. Since the shaft is centered in the undamaged bores, the damaged bores are cut about the same center line as the undamaged bores to assure proper alignment.

However, if all of the bores or all except one of the bores are damaged, there is no equipment presently available for carrying out the line boring operation to salvage the cylinder block. Without two undamaged bores available, conventional equipment cannot support and/or align the shaft in extension along a line which passes through the center of each bore. Since the block cannot be salvaged, the current practice is to scrap all engine blocks in which all of the bores are damaged or all but one of the bores are damaged. Due to the high cost of the blocks, such scrapping is a substantial economic waste. For example, when a large diesel engine block must be scrapped due to damage to its bores, many thousands of dollars are lost.

SUMMARY OF THE INVENTION

It is the primary object of the present invention to provide a tool which facilitates accurate line boring of all diesel engine blocks, even those in which all of the bores are extensively damaged. Another object of the invention is to provide a tool which is equally useful when only some of the bores are damaged. In this event, the damaged bores are cut about the center line of the undamaged bores in order to assure proper alignment. An additional feature of significance is the provision of an adapter plate which is used with cylinder blocks having locating holes rather than the more common dowels.

In accordance with the invention, a mounting pad is provided with two holes which can be fitted on the dowels which commonly project from each end of the cylinder block of a diesel engine. A large central opening of the pad is so located relative to the holes as to be substantially centered with respect to the bores for the main bearings. By mounting one pad on each end of the cylinder block, a conventional line boring shaft carrying a cutting tool can be supported on bearings fitted in the central openings of the two pads in alignment with the center line of the block. The shaft thus extends exactly through the center of each bore, and the damaged bores can be cut about the true center line of the engine. Each pad has an adjustment mechanism that permits the shaft to be centered with respect to any undamaged bores that are present. This results in the damaged bores being cut about the same center as the undamaged bores, thereby assuring alignment even if the undamaged bores are offset from the true center line.

If the cylinder block is the type having locating holes rather than projecting dowels, an adapter plate can be employed. The adapter plate includes pins which fit in the locating holes of the engine block and a pair of dowels projecting from the body of the plate. The mounting pad can be attached to the adapter plate by fitting the holes of the pad over the dowels on the adapter plate, and the central opening of the pad is thus centered in relation to the bores for the main bearings of the engine. Consequently, the shaft which is used in the line boring operation extends through the center of each bore in order to assure accuracy.

DESCRIPTION OF THE DRAWINGS

In the accompanying drawings which form a part of the specification are to be read in conjunction therewith and in which like reference numerals are used to indicate like parts in the various views:

FIG. 4 is an exploded perspective view showing the manner in which an adapter plate and mounting pad are applied to a diesel engine block having locating holes rather than projecting dowels;

FIG. 5 is an enlarged top plan view of the adapter plate shown in FIG. 4;

FIG. 6 is a front elevational view of the adapter plate; and

FIG. 7 is a sectional view taken generally along line 7—7 of FIG. 6 in the direction of the arrows.

DETAILED DESCRIPTION OF THE INVENTION

Figure 1:
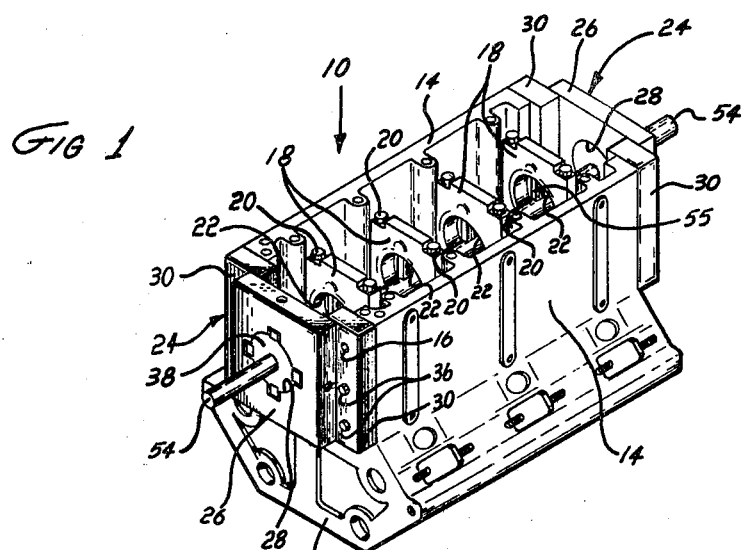
FIG. 1 is a perspective view showing the tool of the present invention applied to a diesel engine block in operating position to carry out accurate line boring of the block.

Referring now to the drawings in more detail and initially to FIG. 1, reference numeral 10 generally designates the cylinder block of a conventional diesel engine. The cylinder block is shown in an inverted position such that the cylinder head 12 is located at the bottom. The side walls 14 of the block are parallel to one another. A small dowel 16 (only one of which is shown in FIG. 1) projects outwardly from each end of each side wall 14 at a location slightly above its lower edge (or slightly below the upper edge of the side wall when the block is inverted as shown in FIG. 1). The specific location of the dowel varies among the various engine models.

The engine is equipped with a plurality of spaced apart "caps" 18 which are bolted at 20 to the engine block. The caps 18 cooperate with adjacent "saddles" 21 (see FIG. 4) on the engine block to form circular bores 22 in which the main crankshaft bearings (not shown) are mounted. Bores 22 are exactly aligned with one another in order to assure proper support of the crankshaft (not shown) which is supported by the main bearings. During manufacture of the engine block, the dowels 16 are located a predetermined distance from the center line of the block which is a line extending through the center of each bore 22. The location of dowels 16 relative to the center line of the block is accurate to within a tolerance of several thousandths of an inch.

The present invention is directed to a tool which is used in line boring to repair damaged areas of the bores 22. The bores become damaged when the main bearings overheat and cause thermal deformation and distortion of the caps 18 and saddles 21 of the cylinder block. The damaged bores cannot properly receive replacement bearings and thus must be repaired if the block is to be salvaged.

The tool of the present invention includes a pair of mounting pads which are generally identified by reference numeral 24. In practice, one pad 24 is installed on each end of the cylinder block 10. The mounting pads are identical to one another (except possibly for the bolt holes and dowel holes), and only one will be described in detail.

Figure 2:
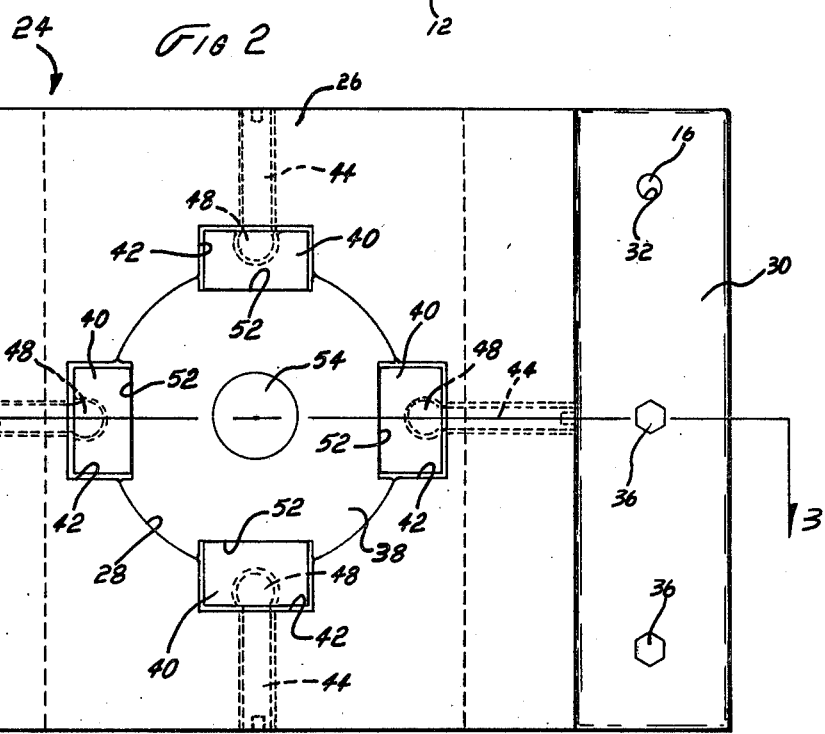
FIG. 2 is a front elevational view on an enlarged scale of one of the mounting pads included in the tool.
Figure 3:
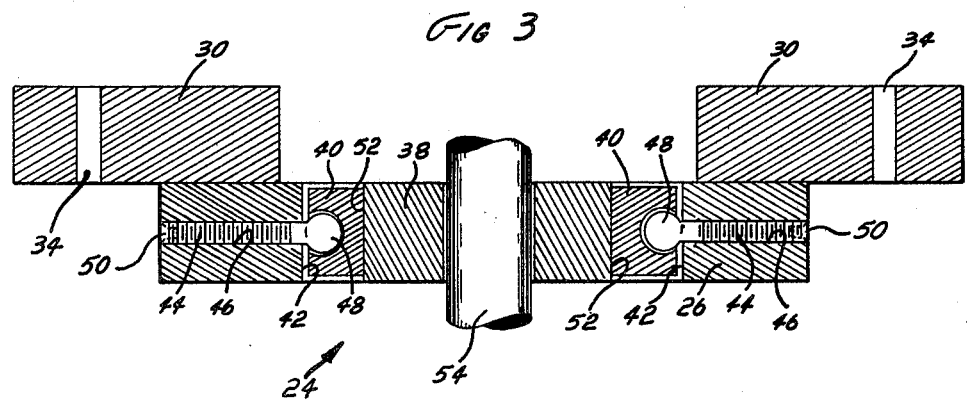
FIG. 3 is a sectional view taken generally along line 3—3 of FIG. 1 in the direction of the arrows.

Referring additionally to FIGS. 2 and 3, each mounting pad 24 includes a square central plate 26 having a thickness of approximately one inch. A circular opening 28 is formed through the center of plate 26 and is substantially the same size as the bores 22 of the engine block. Each pad further includes a pair of flanges 30 which are secured to one of the large surfaces of plate 26. Each flange 30 is approximately one inch thick and projects beyond the adjacent side edge of plate 26. As best shown in FIG. 3, flanges 30 are centered on a common plane offset from and parallel to the plane passing through the center of plate 26.

Each flange 30 is provided near its upper end with a circular hole 32 having a size to be closely fitted over one of the dowels 16 projecting from the end of the cylinder block 10. The holes 32 are so located that when they are fitted on the respective dowels 16, the central opening 28 in plate 26 is centered relative to the center line of the engine block. In this manner, the known spacial relationship between dowels 16 and the center line of the cylinder block is used to assure that the center of opening 28 is in (within the manufacturing tolerance) alignment with the centers of bores 22.

Each flange 30 is also provided with a pair of bolt holes 34. Bolts 36 can be extended through the bolt holes 34 in order to secure each pad 24 to the end of the cylinder block with opening 28 exactly aligned with the bores 22 for the main bearings of the engine. A bearing 38 can thus be inserted in each opening 28 at a centered position with respect to bores 22.

Each mounting pad 24 is provided with an adjustment mechanism which permits bearing 38 to be adjusted in opening 28. The adjustment mechanism includes four shoes 40 which are block members fitting in rectangular notches 42 formed in plate 26 on both sides of opening 28 and above and below the opening. The notches 42 are spaced at 90° intervals around opening 28. Each shoe 40 is carried on the end of a screw 44 which is threaded through an internally threaded passage 46 formed in plate 26. Each passage 46 extends into the corresponding edge of plate 26 and terminates at the corresponding notch 42. The passages 46 extend into both side edges and the top and bottom edges of plate 20. The inner end of each screw 44 carries a ball 48 that fits in a corresponding socket in the shoe 40 such that the shoe can "float" on the end of the screw in self-adjusting or self-aligning fashion. The outer end of each screw 46 is provided with a socket 50 for receiving a suitable wrench that serves to thread the screw in and out.

As best shown in FIG. 2, each shoe 40 fits in a small notch 52 formed in the adjacent surface of bearing 38. It is to be noted that the bearing can be shifted slightly to either side by threading one of the side screws 44 inwardly and the opposite screw outwardly a corresponding distance. Similarly, the bearing can be shifted up or down by appropriately adjusting the upper and lower screws 44.

In use, a pair of mounting pads 24 are installed as shown in FIG. 1 on the opposite ends of a cylinder block 10 having one or more damaged bores 22. The fit of dowels 16 in holes 32 assures that the central opening 28 in each pad will be substantially centered with respect to the true center line of the engine block. The bearing 38 in opening 28 must be centered on the center line of the engine if shaft 54 is to be centered. Such centering of each bearing 38 can be achieved simply by maintaining it in the same position as it occupied when used with another block on which the bearing was centered. This assures that the bearing will be centered within the manufacturing tolerance, due to the use of dowels 16 to locate the pad. Alternatively, a jig (not shown) can be used to assure that the bearing is centered. Since the center line of the block extends through the center of each bore 20, the center of each bearing 38 is aligned with the center of each bore 22 (within the manufacturing tolerance). The bolts 36 serve to secure each pad 24 in the proper position on the end of the block. The plate 26 of each pad is spaced away from the adjacent end of the block.

The bearings 38 provide rotative support for a conventional line boring shaft 54 which, by virtue of the centered positions of the bearings, extends along the true center line of the engine block and through the center of each bore 22. Shaft 54 carries a conventional cutting tool 55 which, upon rotation of the shaft by means of a drill or another power tool, is turned about the center line of the shaft to cut away the damaged areas of caps 18 and the "saddles" 21 surrounding each damaged bore 22. The center of each of the enlarged bores 22 resulting from the line boring operation is aligned with the center of the remaining bores and with the center line of the block since each bore is cut about the axis of shaft 54. The enlarged bores can each be fitted with a sleeve bushing (not shown) which receives the replacement bearings, and the crankshaft can then be properly supported on the engine block.

If each of the bores 22 is damaged and needs to be repaired, the bores 22 are repaired in succession in this manner. Even if shaft 54 is offset slightly from the center line of the bores due to manufacturing tolerances, each bore 22 is nevertheless centered on the shaft so that the offset has no adverse effect. It is to be noted that the tool of this invention can be used to assure accuracy in the line boring operation even if all of the bores 22 are damaged. This is to be contrasted with existing tools which require at least two undamaged bores to permit salvage of the block.

If some of the bores 22 are undamaged, there is no need to enlarge them. Since the undamaged bores may be offset slightly from a centered position on the true center line of the engine or dowels 16 may be offset slightly from their ideal locations (due to the manufacturing tolerance), it is necessary to assure that shaft 54 extends exactly through the centers of the undamaged bores so that the damaged bores will be cut about a center line that is common to the undamaged bores. In this situation, opening 28 is slightly out of alignment with the undamaged bores, and the position of each bearing 38 in its opening 28 is adjusted until shaft 54 is exactly centered with respect to the undamaged bores, as indicated by a gauge or similar instrument (not shown). By threading the appropriate screws 44 into or out of their passages 46, such adjustment can be quickly and accurately carried out. Once shaft 54 has been properly positioned in extension through the center of each undamaged bore 22, the line boring operation can proceed to effect repair of the damaged bores.

The adjustment mechanism thus assures that the damaged bores will be cut about a center line extending through the centers of the undamaged bores, even in a situation where the undamaged bores are offset from the true center line of the engine block. Although each bore will then be offset somewhat from a centered position on the true center line of the engine block, all of the bores are in alignment so that the crankshaft will be properly supported. The adjustment mechanism associated with each pad 24 thereby permits accurate line boring when there are undamaged bores present at positions offset from the center line of the engine block. Since the bores are offset from the true center line no more than several thousandths of an inch, the adjustment mechanism need provide only a small adjustment.

Referring now to FIG. 4, reference numeral 110 generally designates a cylinder block which is identical to block 10 except that the dowels 16 are replaced by a pair of openings 56 formed in the bottom of the block adjacent each end thereof. In all other respects, block 110 is identical to block 10, and the components of block 110 are identified by the same numerals employed in FIG. 1. During manufacture, holes 56 are located a predetermined distance from the center line of the block, within a manufacturing tolerance of several thousandths of an inch.

The present invention includes an adapter plate 58 which is used with diesel engine blocks of the type shown in FIG. 4. The adapter plate 58 has a flat body which is provided with a central opening 60 having the same size and shape as the opening 28 in pad 24. A short flange 62 extends from the upper edge of plate 58 and is provided with a pair of downwardly extending pins 64. The pins 64 are spaced apart from one another and are located and sized to fit closely in the locating openings 56 of the cylinder block.

A pair of dowel pins 66 project generally outwardly from the body of plate 58 at a location below its upper edge. The dowels 66 are perpendicular to pins 64. The location of dowels 66 relative to pins 64 is such that when the adapted plate is attached to the engine block with pins 64 extending into openings 56, dowels 66 are at the same locations as the dowels 16 of an engine block of the type shown in FIG. 1. Also, opening 60 is substantially centered relative to the center line of cylinder block 110. A pair of bolt holes 68 are formed through plate 58 at a location to align with bolt holes 70 of the cylinder block.

The purpose of adapter plate 58 is to properly locate the mounting pad 24 with respect to a cylinder block of the type shown in FIG. 4. Since the locating holes 56 have a known spacial relationship with the true center line of the cylinder block (within a manufacturing tolerance of several thousandths of an inch), dowels 66 can be located relative to pins 64 such that dowels 66 are in the same positions as the dowels 16 shown in FIG. 1. Therefore, openings 32 of mounting pad 24 can be fitted on dowels 66 to assure that the central opening 28 in the mounting pad will be substantially centered with respect to the bores 22 of the cylinder block 110. Bolts 36 can then be extended through the bolt holes 34 and 68 of the mounting pad and adapter plate, respectively, and threaded into bolt holes 70 of the cylinder block to secure the mounting pad and adapter plate in the proper positions on the block. It is to be understood that each end of the cylinder block is provided with a mounting pad and adapter plate in practicing the invention.

The arrangement of FIG. 4 is used in the same manner as the arrangement of FIG. 1 when block 110 is to be line bored. Again, the adjustment mechanism permits limited adjustment of the shaft in order to assure that it is positioned on the center line of the block or the center line of any undamaged bores 22. The adapter plate 58 permits identical mounting pads 24 to be used with both types of cylinder blocks (the type shown in FIG. 4 as well as the type shown in FIG. 1).

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a tool for line boring a diesel engine block having a pair of locating holes adjacent an end thereof in a predetermined spatial relationship with substantially aligned bores which receive bearings for the crankshaft of the engine, said tool including a shaft and a cutting device carried on the shaft, the improvement comprising:

an adapter plate having a pair of pin elements projecting therefrom at locations to be fitted in said locating holes of the engine block, said adapter plate having a pair of spaced apart dowel members thereon;

a mounting pad having a pair of spaced apart holes therein at locations to be fitted on the respective dowel members in a manner to position said pad at a predetermined location on said end of the engine block;

means for securing said adapter plate and mounting pad to the engine block with said pin elements in said locating holes of the block and said holes fitted on said dowel members to position said pad at said predetermined location; and an opening in said mounting pad having a center substantially aligned with the centers of the bores of the engine block when said mounting pad is at said predetermined location; and a bearing received in said opening at a location aligned with the center of each bore, said bearing being adapted to rotatively support said shaft in extension through the center of each bore to permit rotation of said shaft for operation of the cutting device to cut damaged bores about aligned centers thereof.

2. The improvement set forth in claim 1, wherein said adapter plate includes a flange projecting therefrom, said flange carrying said pin elements thereon.

3. The improvement set forth in claim 2, wherein said pin elements are substantially perpendicular to said dowel members.

4. The improvement set forth in claim 1, including an opening in said adapter plate aligned with said opening in the mounting pad when said holes are fitted on said dowel members.

5. The improvement set forth in claim 1, including means on said mounting pad for adjusting the position of said bearing in said opening to permit alignment of the bearing with bores of the engine block which are out of alignment with the opening when said pad is at said predetermined location.

* * * * *